United States Patent [19]

Jeffer

[11] Patent Number: 5,625,919
[45] Date of Patent: May 6, 1997

[54] DUAL ARTICULATED WINDSHIELD WIPER ASSEMBLY

[76] Inventor: Peter H. Jeffer, 15 Gay St., New York, N.Y. 10014

[21] Appl. No.: 520,254

[22] Filed: Aug. 28, 1995

[51] Int. Cl.⁶ ............................................. B60S 1/38
[52] U.S. Cl. .................... 15/250.41; 15/250.451; 15/250.33; 15/250.361
[58] Field of Search .................. 15/250.41, 250.4, 15/250.48, 250.19, 250.33, 250.31, 250.44, 250.451

[56] References Cited

U.S. PATENT DOCUMENTS

| | | | |
|---|---|---|---|
| 2,025,888 | 12/1935 | Olivero | 15/250.4 |
| 2,834,976 | 5/1958 | Oishei | 15/250.48 |
| 3,040,359 | 6/1962 | Deibel | 15/250.48 |
| 3,099,031 | 7/1963 | Ludwig | 15/250.451 |
| 3,405,421 | 10/1968 | Tomlin | 15/250.44 |
| 3,414,930 | 12/1968 | Kodama | 15/250.48 |
| 4,698,874 | 10/1987 | Fritz, Jr. | 15/250.33 |
| 5,243,731 | 9/1993 | Yang | 15/250.41 |
| 5,257,436 | 11/1993 | Yang | 15/250.4 |
| 5,392,488 | 2/1995 | Li | 15/250.41 |
| 5,465,454 | 11/1995 | Chang | 15/250.33 |

FOREIGN PATENT DOCUMENTS

| | | | |
|---|---|---|---|
| 232598 | 8/1987 | European Pat. Off. | 15/250.41 |
| 138048 | 10/1981 | Japan | 15/250.452 |

*Primary Examiner*—Gary K. Graham
*Attorney, Agent, or Firm*—Lyman L. Lyon, P.C.

[57] ABSTRACT

A dual articulated spline windshield wiper assembly for use in a conventional windshield wiper yoke and claw assembly comprises a relative high durometer plastic upper spline and a high durometer plastic lower spline that are coupled for relative rotation about a first axis, the lower spline having a low durometer wiping blade mounted thereon for limited rotation relative to the lower spline about a second axis parallel to said first axis.

3 Claims, 1 Drawing Sheet

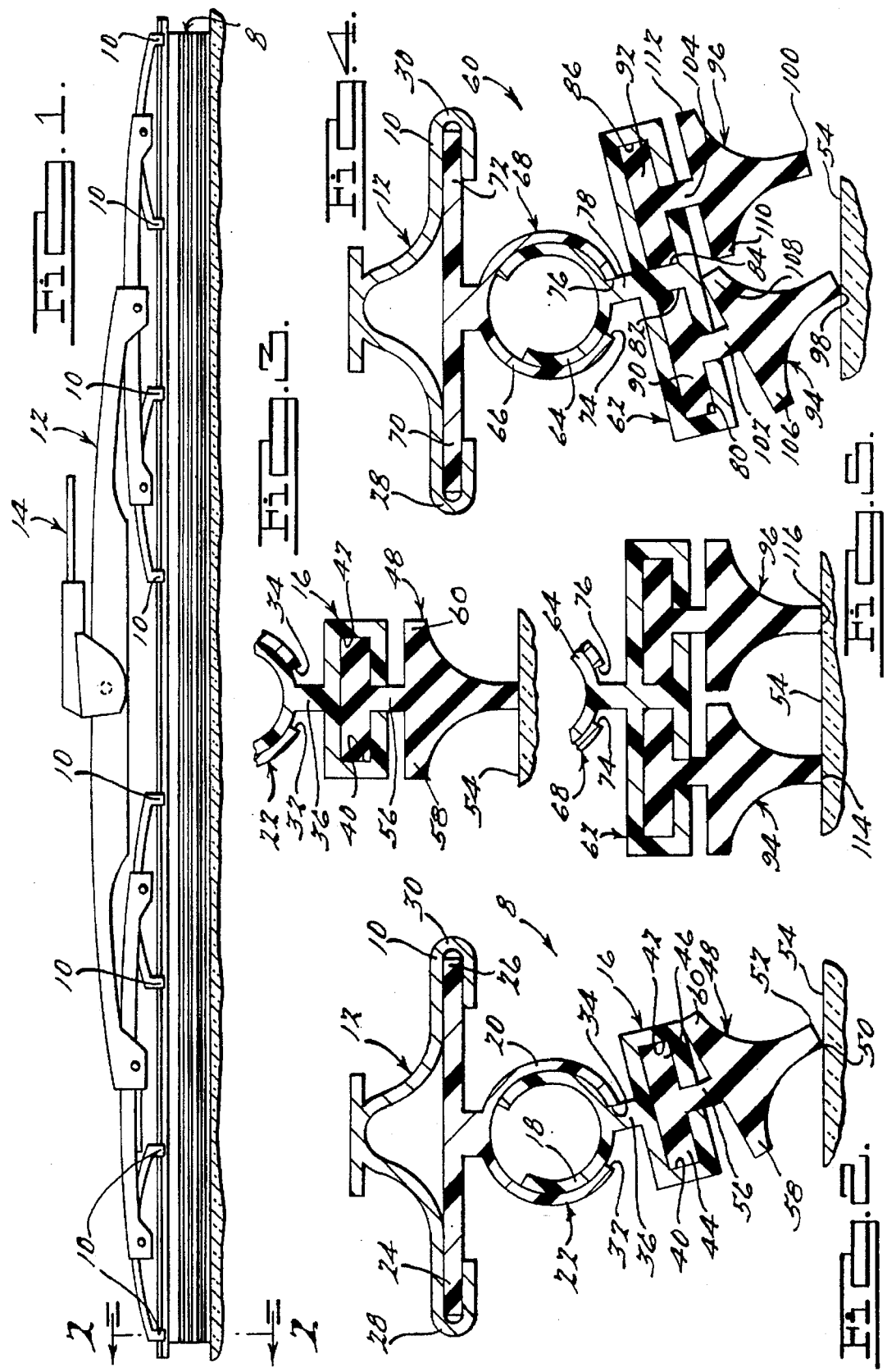

DUAL ARTICULATED WINDSHIELD WIPER ASSEMBLY

BACKGROUND OF THE INVENTION

Windshield wiper blades are required to perform flawlessly, exhibit a relatively long useful life, and be of minimum cost. Prior attempts to improve wiper blade performance by wiping edge orientation and/or selection of blade material, have not fully solved the problem of wiper blade life and performance. Flexure of the elastomeric material of the blade is generally utilized to properly position the wiping edge of the wiper blade on the surface to be wiped. However, excessive flexure of known wiper blades often leads to premature failure of the wiper blade.

SUMMARY OF THE INVENTION

A dual articulated windshield wiper assembly in accordance with the present invention exhibits materially improved performance and life over known wipers by minimizing and controlling flexure of the elastomeric wiping blade during both the wiping stroke and while in the resting state on the windshield.

The dual articulated windshield wiper assembly is adapted to be utilized in a conventional wiper arm and claw system. The assembly comprises two interlocked splines of relatively high durometer plastic, for example, 70–80 on the Shore "A" scale, that pivot relative to one another about a first axis that extends parallel to the surface being wiped. The lower spline of the articulated spline system mechanically positions an elastomeric blade of relatively low durometer, for example 55 to 65 on the Shore "A" scale, at a first angle to the surface to be wiped. The elastomeric blade has a unique neck and flange configuration that allows limited and controlled flexure of the blade about a second axis to a second angle smaller than the first angle, relative to the surface being wiped thereby to enhance resiliency and maximize wiping efficiency.

BRIEF DESCRIPTION OF THE DRAWING

FIG. 1 is an elevational view of a dual articulated windshield wiper assembly in accordance with the present invention;

FIG. 2 is a cross-sectional view taken along the line 2—2 of FIG. 1 with the blade holder and blade rotated to the wiping condition;

FIG. 3 is a view of the assembly of FIG. 2 in the rest condition;

FIG. 4 is a view similar to FIG. 2 of a twin spline assembly having twin wiper blades; and FIG. 5 is a view of the assembly of FIG. 4 in the rest condition.

DETAILED DESCRIPTION OF THE PREFERRED EMBODIMENT(S)

A dual articulated windshield wiper assembly 8, in accordance with a preferred constructed embodiment of the instant invention, is supported in claws 10 of a conventional yoke assembly 12 which, in turn, is supported by a conventional wiper arm 14.

As seen in FIG. 2 and 3, the wiper assembly 8, comprises a lower spline 16 having a cylindrical upper portion 18 that is journaled in a complimentary circular stem portion 20 of an upper spline 22. The upper spline 22 is of generally T-shaped configuration defined by flange portions 24 and 26 on opposite sides of the stem portion 20 thereof. The flanges 24 and 26 are accepted in reentrantly folded edge portions 28 and 30 of the claws 10.

The stem 20 of the upper spline 22 is interrupted, defining a channel therein, so as to define a pair of stops 32 and 34 which are circumferentially spaced from one another at 45 degrees. Rotation of the lower spline 16 relative to the upper spline 22 is limited by engagement of a neck 36 on the lower spline 16 with one or the other of the stops 32 or 34 on the upper spline 22.

The lower spline 16 has a pair of elongated oppositely directed channels 40 and 42 for the acceptance of a pair of flanges 44 and 46, respectively, on a relatively low durometer wiper blade 48. The blade 48 has wiping edges 50 or 52 which engage a surface 54 to be wiped.

In accordance with the present invention, flexure of the elastomeric blade 48 is accommodated by a neck 56 thereon but is limited by a pair of lower flanges 58 and 60 which are engageable with the channel portions 40 and 42 of the lower spline 16, respectively, upon reciprocation of the wiper assembly 8. Thus, the wiping edges 50 and 52 rotate about two spaced axes to enhance resiliency and maximize wiping efficiency while the blade 48 is protected against excessive flexural stress.

As seen in FIG. 3, the blade 48 is free to seat itself on the windshield 54 while in the static condition due to rotation of the lower spline 22 about its axis and by rotation of the blade 48 about the axis provided by the neck 56 thereon.

As seen in FIG. 4 and 5, a modified dual articulated windshield wiper assembly 60, in accordance with another embodiment of the instant invention, is accepted in the claws 10 of the yoke assembly 12. The wiper assembly 60 comprises a lower spline 62 having a hollow cylindrical stem 64 that is journaled in a complimentary circular stem portion 66 of an upper spline 68. The upper spline 68 is of generally T-shaped configuration defined by flange portions 70 and 72 on opposite sides of the stem portion 66 that are accepted in the reentrantly folded edge portions 28 and 30 of the claws 10. The circular configuration of the stem 66 on the upper spline 68 is interrupted so as to define a pair of stops 74 and 76 which are circumferentially spaced from one another at 45 degrees. Thus, rotation of the lower spline 62 relative to the upper spline 68 is limited by engagement of a neck 78 on the lower spline 62 with one or the other of the stops 74 or 76 on the upper spline 68.

The lower spline 62 has two pairs of elongated channels 80–82 and 84–86 for the acceptance of a pair of flanges 90 and 92 on a pair of wiper blades 94 and 96, respectively. Rotation of the lower spline 62 relative to the upper spline 68 alternately presents wiping edges 98 or 100 on the blades 94 and 96, respectively to the surface 54 to be wiped.

In accordance with the present invention, flexure of the elastomeric blades 94 and 96 is accommodated by neck portions 102 and 104 thereon, respectively but such flexure is limited by engagement of a pair of flanges 106–108 and 110–112 on said blades 94 and 96, respectively, with the lower spline 62.

As seen in FIG. 5, and in accordance with one feature of this embodiment of the invention, the lower spline 62 rotates relative to the upper spline 68 to a rest position wherein lower surfaces 114 and 116 on the blades 94 and 96, respectively, rest on the surface 54 in a manner that does not flex or stress the wiping edges 98 or 100 thereof.

While the preferred embodiment of the invention has been disclosed, it should be appreciated that the invention is susceptible of modification without departing from the scope of the following claims.

I claim:

1. A dual articulated windshield wiper blade assembly for acceptance in a conventional windshield wiper yoke and claw assembly said blade assembly comprising:

an elongated, relatively high durometer plastic upper spline of generally T-shaped transverse cross section comprising a pair of oppositely directed flanges engageable in conventional claws of said windshield wiper yoke and claw assembly and a downwardly extending step portion intermediate said flanges of a first circular transverse cross section, said stem portion being interrupted to define a channel therein;

an elongated, relatively high durometer plastic lower spline having an upwardly extending stem portion of a second circular transverse cross section complimentary to the stem portion in said upper spline, said upwardly extending stem portion being received in the channel of said downwardly extending stem portion so as to be supported thereby for relative rotation, said lower spline having at least one pair of opposed inwardly directed channels for acceptance of a relatively low durometer wiper blade in close interlocked relation; and a relatively low durometer wiping blade having a first pair of oppositely directed flanges received in the channels of said lower spline, said blade having a downwardly extending neck extending from said flanges thereof below the channels in said lower spline pivotally supporting a wiping portion, said neck to permit pivoting of said wiping portion relative to said first pair of flanges and said lower spline, said wiping portion defining a second pair of oppositely directed flanges at a lower end of the neck spaced from said lower spline, said second pair of flanges each being engageable with said lower spline to limit rotation of said wiping portion relative thereto, and a wiping edge on said wiping portion engageable with a surface to be wiped upon reciprocation of said wiper blade assembly.

2. A wiper blade assembly in accordance with claim 1 wherein the lower spline of said blade assembly has two pairs of channels, each pair receiving a said wiper blade.

3. A wiper blade assembly in accordance with claim 2 wherein each of said wiper blades has a flat surface engageable with a surface to be wiped when said blade assembly is in a rest condition.

* * * * *